United States Patent
Garcia

(10) Patent No.: US 10,144,256 B1
(45) Date of Patent: Dec. 4, 2018

(54) COUPLER LOCK DEVICE

(71) Applicant: Marco Garcia, Chandler, AZ (US)

(72) Inventor: Marco Garcia, Chandler, AZ (US)

(73) Assignee: U-Haul International, Inc., Phoenix, AZ (US)

( * ) Notice: Subject to any disclaimer, the term of this patent is extended or adjusted under 35 U.S.C. 154(b) by 79 days.

(21) Appl. No.: 15/601,717

(22) Filed: May 22, 2017

(51) Int. Cl.
 *B60D 1/60* (2006.01)
 *B60D 1/06* (2006.01)
(52) U.S. Cl.
 CPC ....... *B60D 1/60* (2013.01); *B60D 1/06* (2013.01)
(58) Field of Classification Search
 CPC .................................. B60D 1/60; B60D 1/605
 See application file for complete search history.

(56) References Cited

U.S. PATENT DOCUMENTS

| | | | |
|---|---|---|---|
| 3,391,555 A | 7/1968 | Mamo | |
| 3,605,457 A | 9/1971 | Foster | |
| 4,141,569 A | 2/1979 | Dilk | |
| 4,730,841 A | 3/1988 | Ponder | |
| 5,322,316 A | 6/1994 | Wheeler | |
| 5,584,495 A | 12/1996 | Mason | |
| 5,681,053 A | 10/1997 | Misukanis et al. | |
| 5,947,506 A | 9/1999 | Bauer | |
| 6,070,441 A | 6/2000 | Bernstrom | |

*Primary Examiner* — Kevin Hurley
(74) *Attorney, Agent, or Firm* — Richard E. Oney; Venjuris, PC

(57) ABSTRACT

A coupler lock device is used with a trailer coupler that has a handwheel mounted on a threaded member for securing a hitch ball in the coupler socket. The coupler lock device has a housing configured for covering the coupler socket and the handwheel. The housing includes an opening to allow the housing to be positioned over the coupler socket and handwheel. A closure panel is movable between an open position and a closed position. The housing includes an aperture configured so that when the housing covers the coupler with the handwheel tightened to properly secure the hitch ball within the coupler socket, the handwheel threaded member protrudes through the top aperture and provides a confirmation that the hitch ball is properly, secured for towing.

17 Claims, 10 Drawing Sheets

COUPLER LOCK DEVICE

BACKGROUND

This invention relates generally to a locking device for a trailer coupler. In particular, the invention relates to a locking device for use with a ball and socket trailer coupler that has a handwheel for securing the hitch ball within the coupler socket.

One well known type of coupler mechanism, the trailer hitch, is commonly used to secure a trailer to a vehicle for transport. Typically, such couplers include a standard ball and socket arrangement which incorporates a retaining mechanism for securing the hitch ball in a retention or coupled position within the coupler socket. The retaining mechanism, which commonly includes a user-operated handwheel, when properly tightened provides a retaining force between the ball and socket, thereby securing the trailer to the towing vehicle.

Since many trailers are used to haul valuable items, such as boats, cars, household belongings, etc., they are highly visible and attractive targets for criminal activity. Although a number of prior art devices have been proposed to deter unauthorized uncoupling and theft of trailers, they suffer from a number of disadvantages. Among others, they have numerous components and as a result are complex to install and have correspondingly high manufacturing and maintenance costs. Moreover, until now, no such device has been suitable for use with a coupler that utilizes a handwheel for securing the hitch ball within the coupler socket.

There is a need, therefore, for a coupler lock device that addresses the foregoing issues. It is an object of the present invention to provide such an apparatus.

Additional objects and advantages of the invention will be set forth in the description that follows, and in part will be apparent from the description, or may be learned by practice of the invention. The objects and advantages of the invention may be realized and obtained by means of the instrumentalities and combinations pointed out in the appended claims.

SUMMARY OF THE INVENTION

To achieve the foregoing objects, and in accordance with the purposes of the invention as embodied and broadly described in this document, there is provided a coupler lock device for use with a trailer coupler having a handwheel rotatably mounted to a threaded member of the trailer coupler and configured to secure a hitch ball within a coupler socket of the trailer coupler in a retention position for towing. The coupler lock device has a housing configured to cover the handwheel of the trailer coupler. In a presently preferred embodiment, the housing is configured to cover the handwheel and the coupler socket. The housing includes an opening configured to allow the housing to be positioned over the handwheel. The housing also has a closure member movable between (i) an open position wherein the housing can be positioned over and removed from the coupler, and (ii) a closed position wherein, when the housing is positioned over the handwheel, the closure member restricts removal of the housing from the coupler. The housing includes an aperture configured so that when the housing is positioned over the handwheel and the hitch ball is secured within the coupler socket in the retention position, the handwheel threaded member protrudes through the aperture.

According to one advantageous aspect of the invention, when the housing is positioned over the handwheel and the hitch ball is secured within the coupler socket in the retention position, the handwheel threaded member protrudes through the aperture by a predefined minimum distance, thereby providing visual confirmation that the hitch ball is appropriately secured in the retention position.

In some embodiments, the closure member can comprise a panel (e.g., a bottom panel) hingedly coupled to the housing. The housing can include a closure tab and the closure member can include a slot configured to receive the closure tab when the closure member is in the closed position. The closure tab can include a hole configured to receive a padlock shackle.

BRIEF DESCRIPTION OF THE DRAWINGS

The accompanying drawings, which are incorporated in and constitute a part of the specification, illustrate the presently preferred embodiments of the invention and, together with the general description given above and the detailed description of the preferred methods and embodiments given below, serve to explain the principles of the invention.

DESCRIPTION

Reference will now be made in more detail to presently preferred embodiments of the invention, as illustrated in the accompanying drawings. While the invention is described more fully with reference to these examples and drawings, the invention in its broader aspects is not limited to the specific details, representative devices, and illustrative examples shown and described. Rather, the description which follows is to be understood as a broad, teaching disclosure directed to persons of ordinary skill in the appropriate arts, and not as limiting upon the invention.

It will be appreciated that terms such as "front," "forward," "rear," "rearward," "upper," "inner," "outer," "vertical," "horizontal," "bottom," "below," "top," "side," "inwardly," "outwardly," "downwardly" and "lower" and other positionally descriptive terms used in this specification are used merely for ease of description and refer to the orientation of the referenced components as shown in the figures. It should be understood that any orientation of the components described herein is within the scope of the present invention.

Figure 1A:
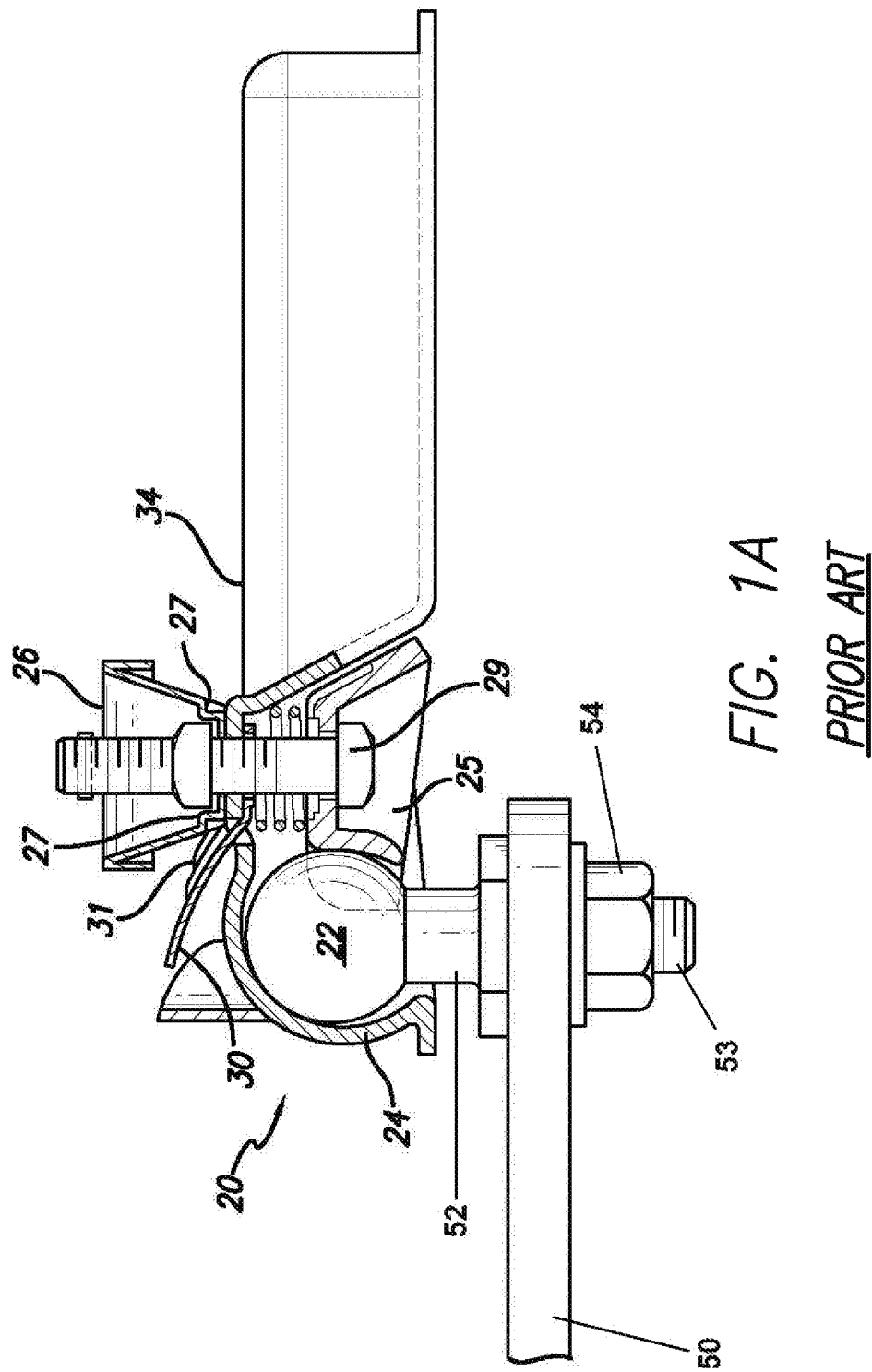
FIG. 1A is a right side sectional view of a prior ball clamp trailer coupler showing the hitch ball secured within the coupler socket with the ball clamp positioned in contact with the handwheel tightened and the hitch ball in a retention position.
Figure 1B:
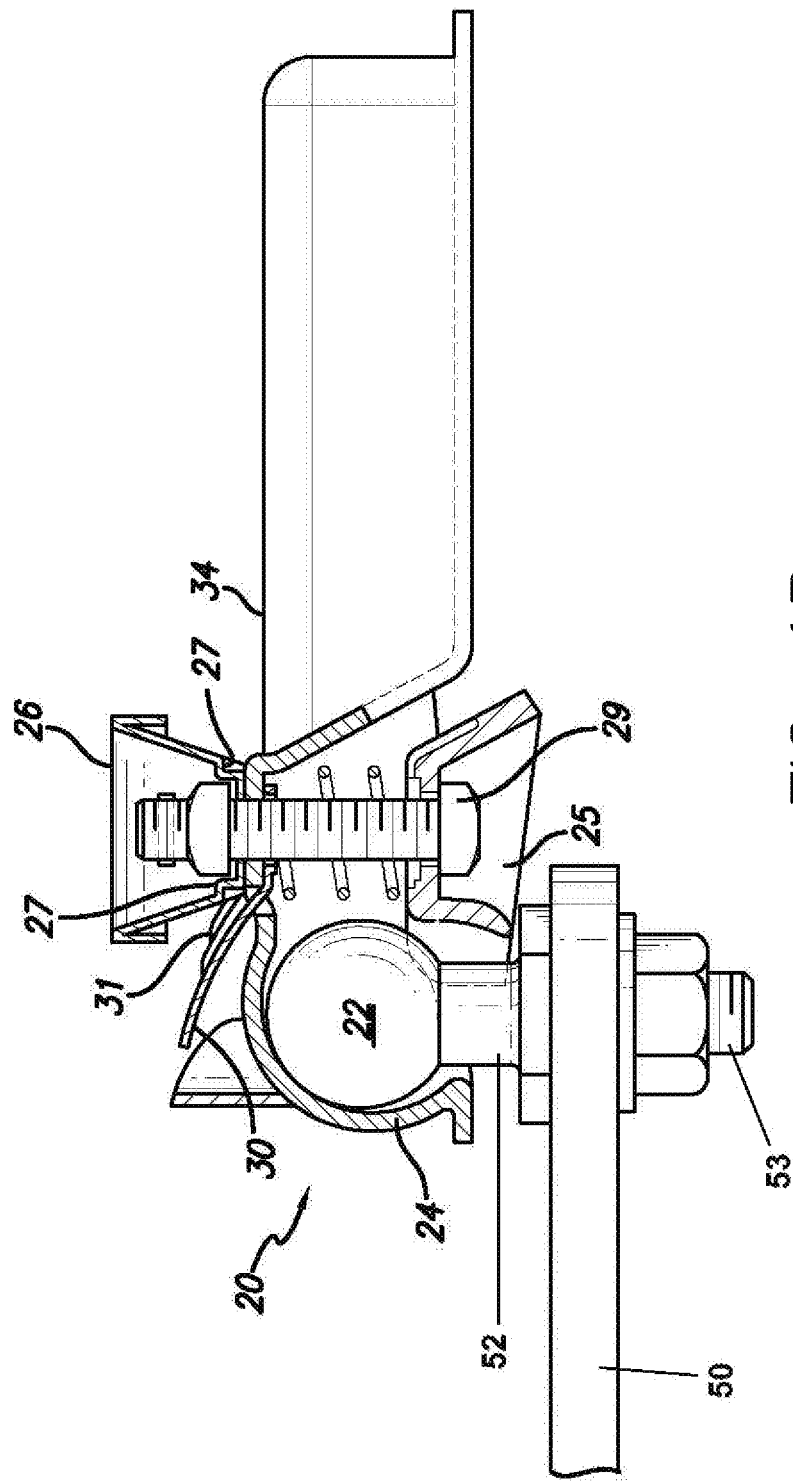
FIG. 1B is a right side sectional view of the trailer coupler of FIG. 1A showing the hitch ball within the coupler socket with the handwheel loosened and the ball clamp positioned away from the hitch ball in a release position.

For purposes of explanation, and to further assist in the understanding of this invention, a brief description of the operation of a standard previously-known ball and socket coupler with a handwheel follows. Referring to FIGS. 1A and 1B, a hitch ball 22 is commonly affixed to the rear end of a tow vehicle (not shown), such as a truck or sport utility, vehicle, utilizing a standard mounting that can support the tongue weight of the trailered vehicle and that includes a hitch ball support 50. In the embodiment of FIGS. 1A and 1B, the hitch ball 22 is formed at one end of a ball stem 52, which has a threaded portion 53 at the other end for receiving a ball nut 54 to affix the hitch ball 22 to the hitch ball support 50. A coupler 20 is affixed, by commonly known techniques, e.g. welding, bolting, etc., to the frame of the vehicle that is to be towed, e.g. a trailer 21, thus forming an integrated frame unit. The coupler 20 has a coupler body 34 with a ball-shaped coupler socket 24 for receiving the hitch ball 22 when the trailer 21 is hitched to the tow vehicle. In operation the trailer coupler socket 24 is lowered from an elevated height onto the hitch ball 22 such that the coupler socket 24 engulfs the hitch ball 22.

Still referring to FIGS. 1A and 1B, the ball and socket coupler further includes a user rotatable handwheel 26. The handwheel 26 is rotatably mounted upon a threaded bolt 29 such that rotation of the handwheel 26 draws or urges the threaded bolt 29 and a ball clamp 25 depending from the bolt 29 either toward or away from the hitch ball 22. The ball clamp 25 has a curved surface that conforms to the curved surface of the hitch ball 22. Upon rotation of the handwheel 26 in the appropriate direction (usually clockwise), the ball clamp 25 is drawn upward and toward the hitch ball 22, thereby decreasing the effective opening dimension of the coupler socket 24 until the ball clamp 25 contacts the hitch ball 22 and secures it within the coupler socket 24. In this retention position, as shown in FIG. 1A, the ball clamp cooperates with the coupler socket 24 to prevent removal of the hitch ball 22 from the coupler socket 24. Similarly, upon rotation of the handwheel 26 in the opposite direction (typically counterclockwise), the ball clamp 25 is moved downward and away from the hitch ball 22 to a release position, shown in FIG. 1B, which allows the hitch ball 22 to be released from the socket 24.

As shown in FIGS. 1A and 1B, a spring loaded retaining tab 30 is usually provided in ball and socket hitches in order to maintain the ball clamp 25 in the retention position. The tab 30 has a projection 31 that engages recesses 27 formed in the periphery of the handwheel 26. The tab 30 exerts a biasing force against one of the wheel recesses 27 to maintain the tab 30 in engagement with the handwheel 26. When engaged, the tab 30 prevents rotation of the handwheel 26, rotation being permitted only when the projection 31 of tab 30 is pivoted away from the recess 27 in the handwheel periphery.

During the rotation of the handwheel 26, the retaining tab 30 is continually depressed by the operator. The depression of the tab 30 disengages the tab projection 31 from the recesses 27 formed in the periphery of the handwheel 26. Upon positioning the handwheel 26 such that the coupler assembly 20 is in a coupled condition, the operator releases the tab 30 so that it engages one of the recesses 27 formed in the lower periphery of the handwheel 26, thus securing the handwheel 26. Minor additional rotation of the handwheel 26 may be required to properly align the tab 30 in one of the recesses 27. Proper alignment of the tab 30 in one of the handwheel recesses 27 helps prevent the handwheel 26 from becoming inadvertently loosened by vibrations, or other unexpected forces.

In the operation of the previously-known coupler illustrated in FIGS. 1A and 1B, the trailer/coupler assembly is first aligned over the hitch ball 22 with the ball clamp 25 in the release position. The trailer is then lowered so that the coupler socket 24 engulfs the hitch ball 22, as shown in FIG. 1B. After the hitch ball 22 is positioned in the socket cavity 24, the handwheel 26 is then rotated to move the ball clamp 25 into the retention position shown in FIG. 1A. In this position, the ball clamp 25 reduces the effective opening of the coupler socket 24 so that the hitch ball 22 can no longer be readily retracted from the coupler socket 24 and the coupler assembly 20 is securely coupled.

Having described the operational characteristics of a typical ball and socket coupler, the features of a coupler lock device according to the present invention will now be described.

Figure 2:
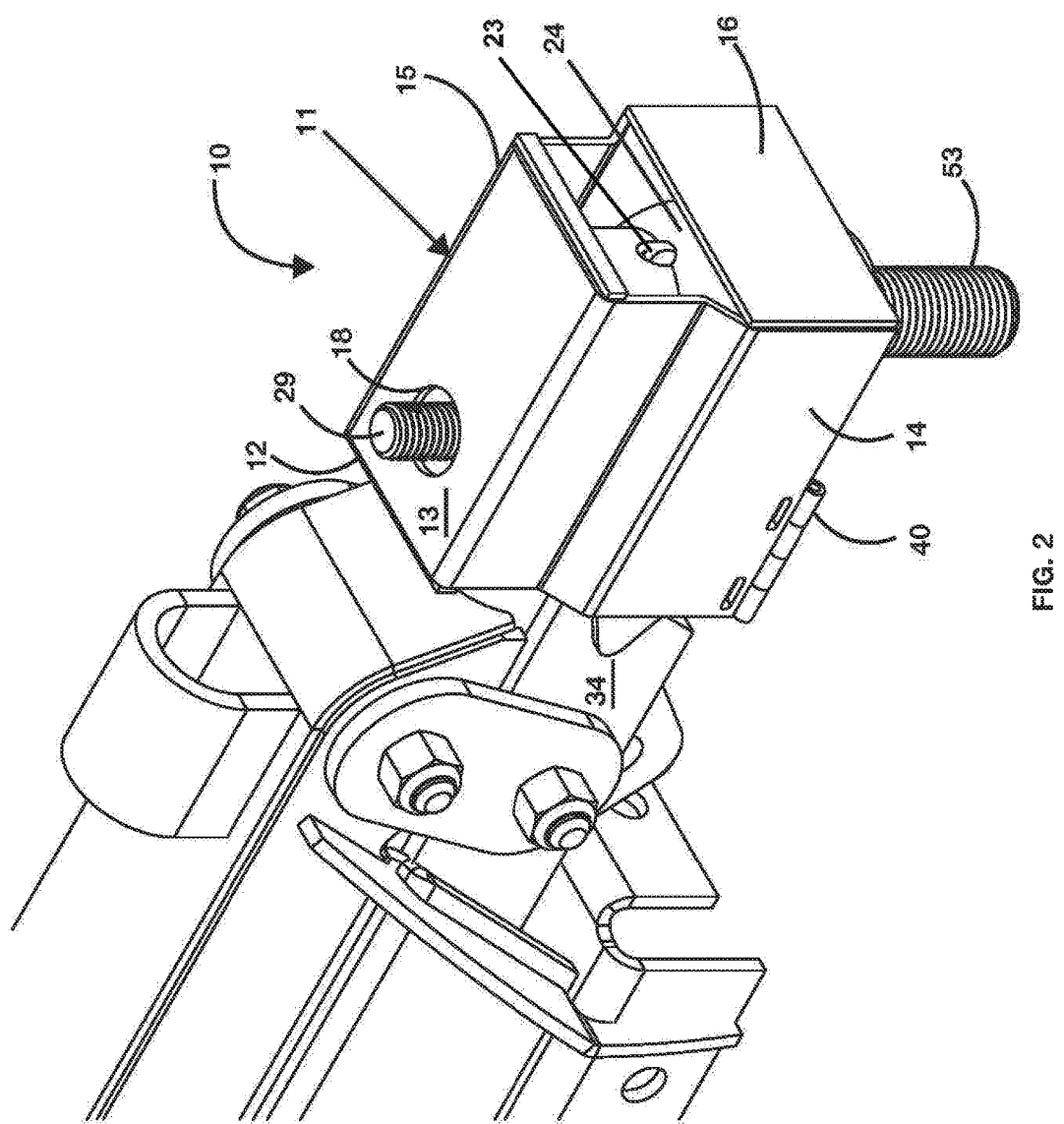
FIG. 2 is a top left perspective view of the trailer coupler of the type shown in FIG. 1 in combination with one embodiment of a coupler lock device according to the present invention, showing the coupler lock device positioned over the coupler socket, handwheel and hitch ball.
Figure 3:
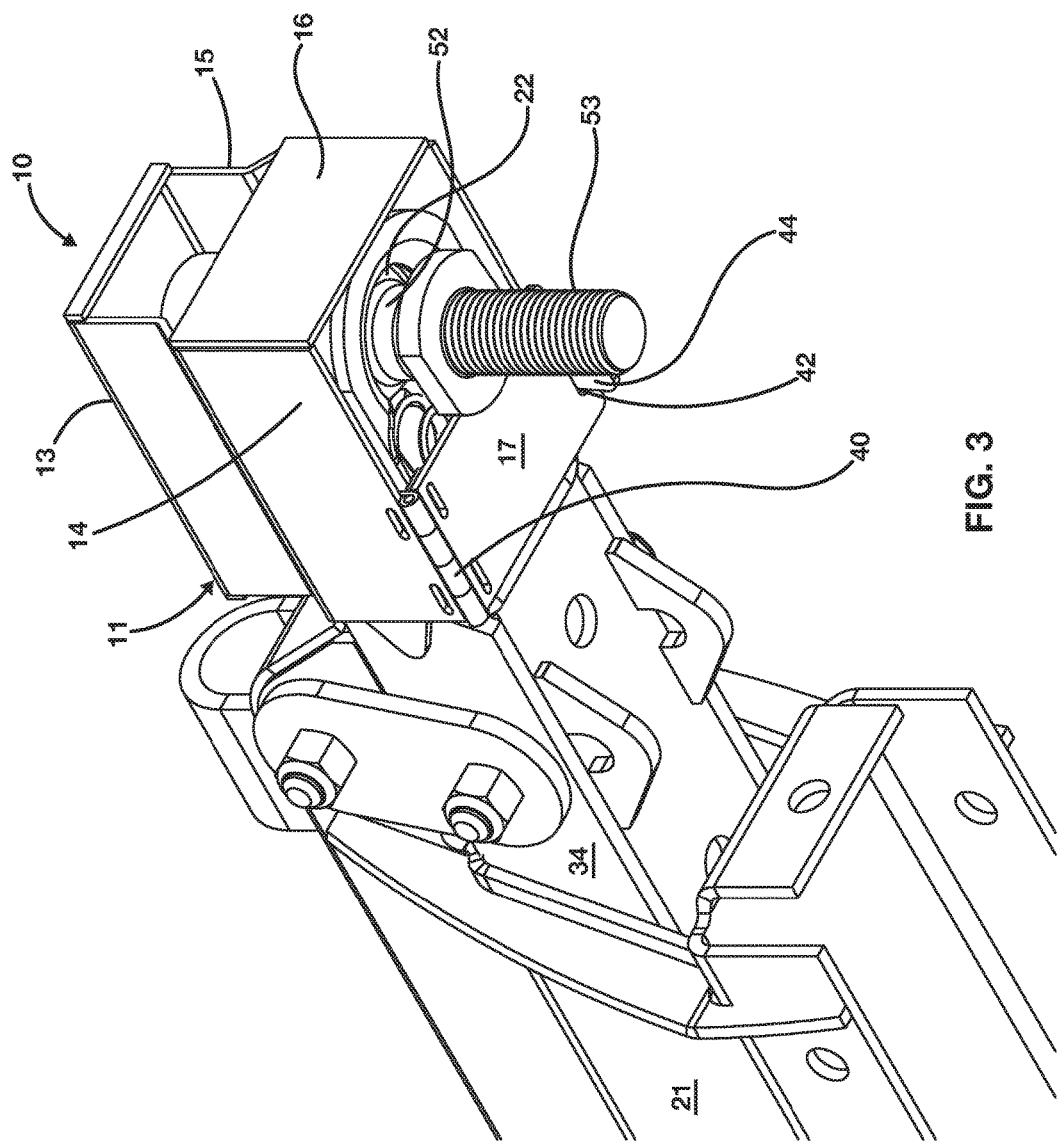
FIG. 3 is a bottom left perspective view of the trailer coupler and lock device combination of FIG. 2.
Figure 4:
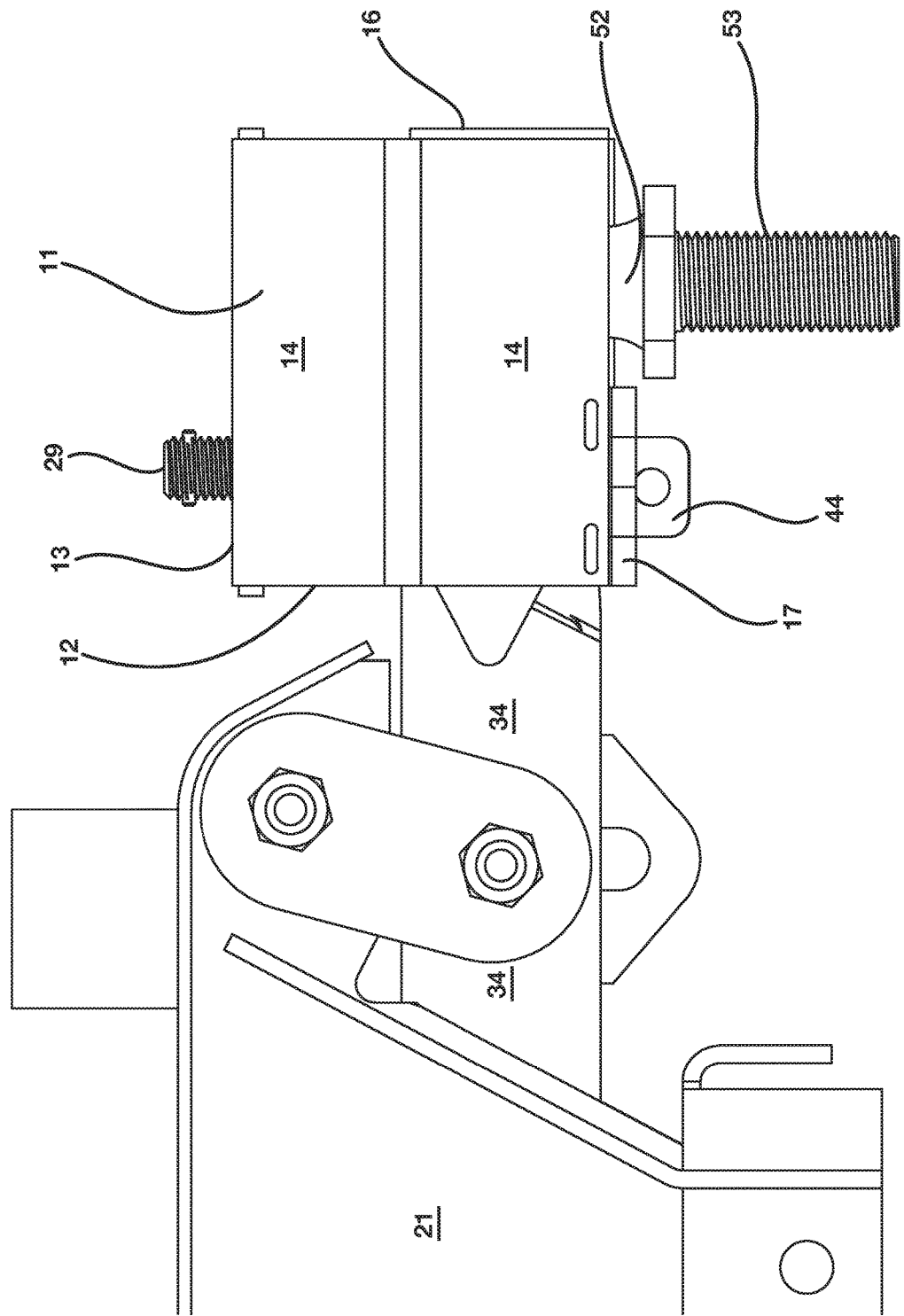
FIG. 4 is a left elevation view of the trailer coupler and lock device combination of FIG. 2.
Figure 6:
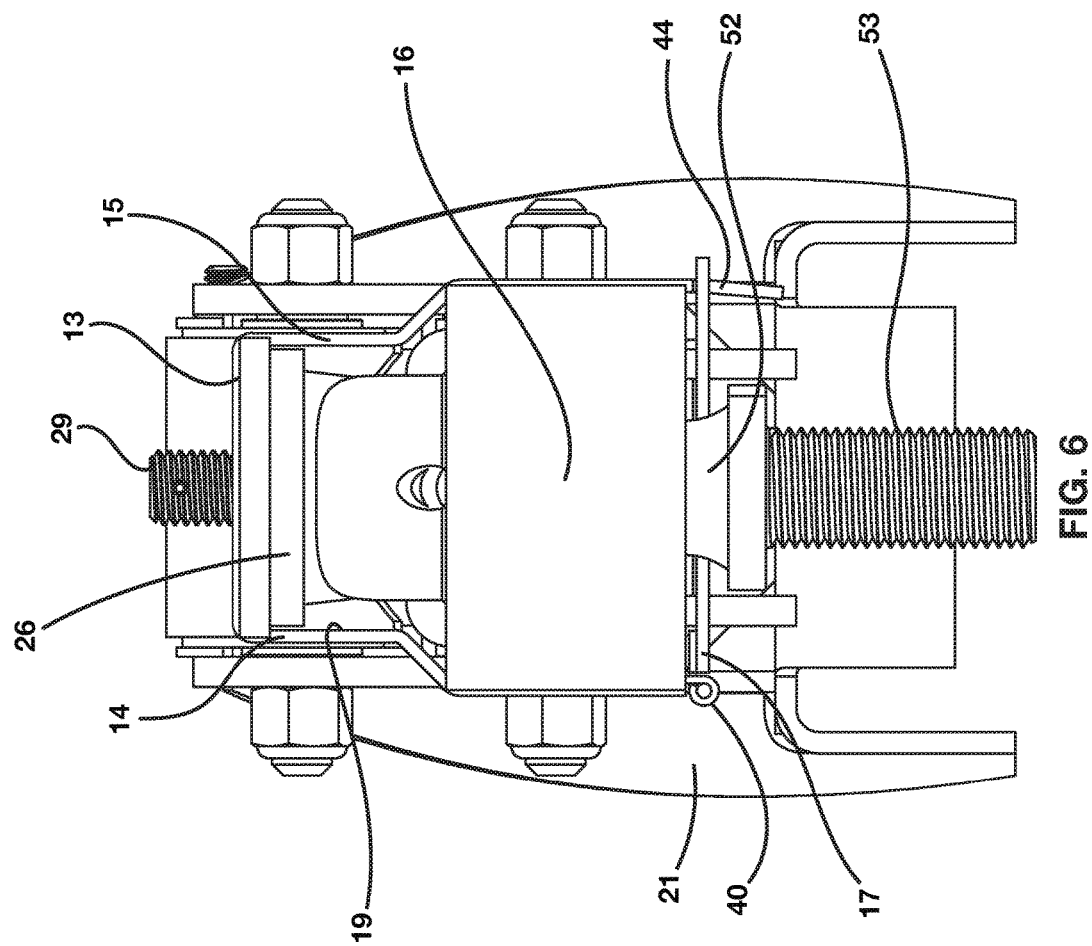
FIG. 6 a front elevation view of the trailer coupler and lock device combination of FIG. 2.
Figure 7:
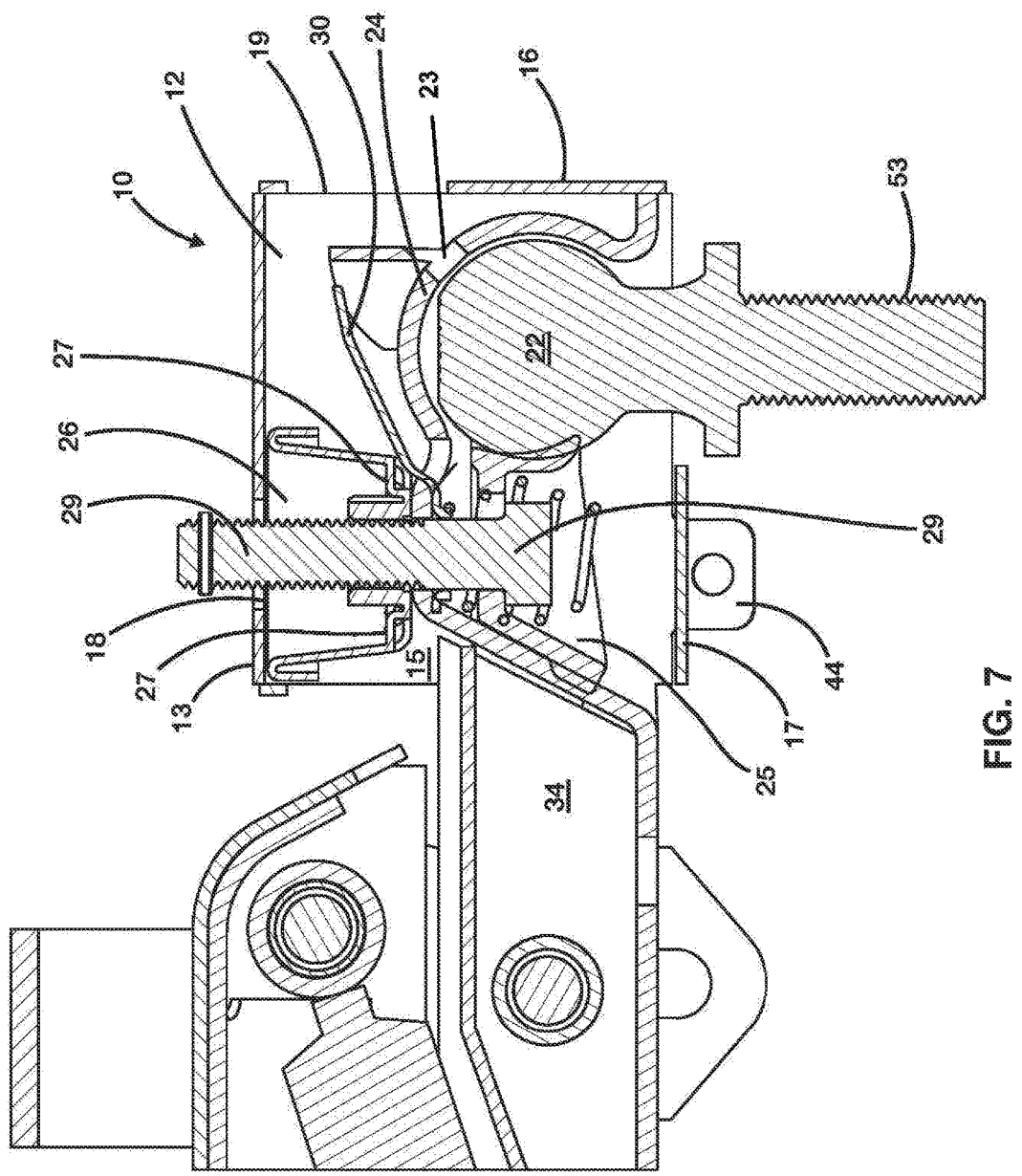
FIG. 7 is a cross-sectional side elevation view of the trailer coupler and lock device combination of FIG. 2, showing the hitch ball secured within the coupler socket in the retention position of FIG. 1A with the handwheel threaded bolt protruding through the coupler lock top panel aperture.
Figure 8:
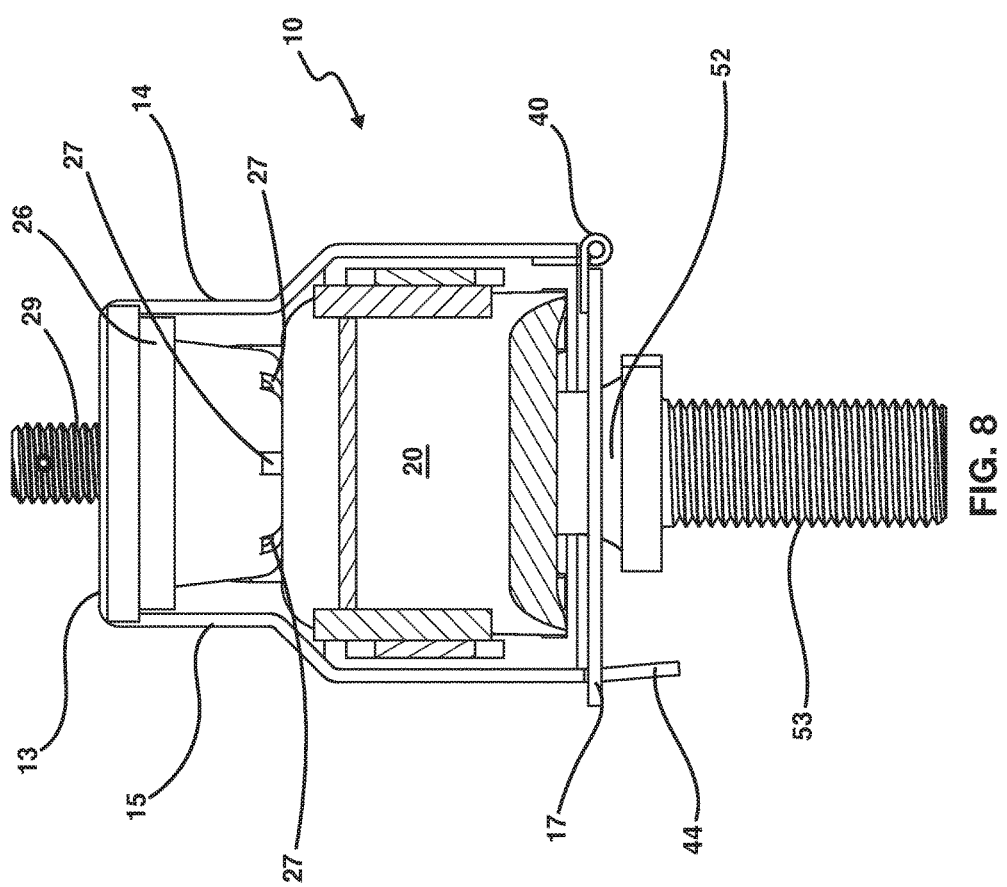
FIG. 8 is a rear elevation view of the trailer coupler and lock device combination of FIG. 2, showing the closure panel in the closed position.
Figure 9:
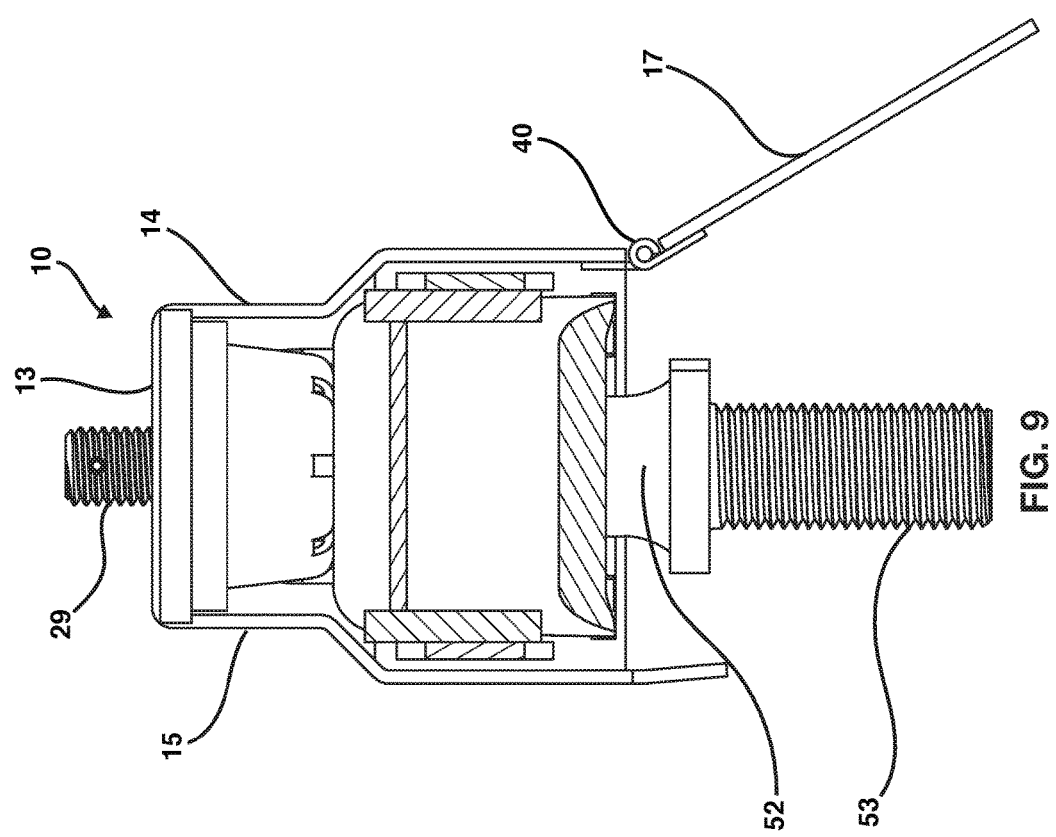
FIG. 9 is a rear elevation view of the trailer coupler and lock device combination of FIG. 2, showing the closure panel in the open position.

FIGS. 2-9 illustrate one embodiment of a coupler lock device 10 according to the present invention, shown in combination with a ball and socket coupler of the type shown in FIGS. 1A and 1B. The lock device 10 includes a housing 11 which defines a rear opening 12 that receives the coupler 20 to allow for placement of the lock device 10 over the coupler 20. The housing 11 includes a top panel 13, side panels 14, 15, a front panel 16 and hinged closure panel 17. The front panel 16 has a front opening 19 to allow a user to see a sight hole 23 in the coupler socket 24. The sight hole 23, which is present in some embodiments of the coupler 20, allows a user to visually confirm that the hitch ball 22 is properly positioned within the coupler socket 24. The top panel 13 has an aperture 18, through which the handwheel threaded bolt 29 protrudes when the lock device is placed over the coupler 20 and the handwheel is properly tightened to hold the hitch ball 22 in the retention position shown in FIG. 1A. The closure panel 17 has a hinge 40 mounted to one side and a slot 42 in an opposing side. The hinge 40 is also mounted to one side panel 14 so that the closure panel 17 can be rotated between an open position (as can be seen in FIG. 9) and a closed position (as can be seen in FIG. 8). The other side panel 15 has a security padlock tab 44 that projects downward through the slot 42 when the closure panel 17 is in the closed position (as can be seen in FIG. 3).

A coupler lock device 10 according to the present invention can be used to deter unauthorized removal of a trailer or other towed vehicle from a towing vehicle. With the coupler handwheel 26 tightened and holding the hitch ball 22 in the retention position (i.e., with the trailer coupled to the towing vehicle), the housing 11 can be positioned over the coupler socket 24, handwheel 26 and hitch ball 22 by moving the closure panel 17 to the open position (as can be seen in FIG. 9). After doing so, the closure panel 17 can then be moved to the closed position, thereby enclosing the coupler socket 24, handwheel 26 and hitch ball 22 within the housing 11 (as can be seen in FIGS. 6 and 8). In this position, a security padlock (not shown) can be engaged, with the padlock shackle through the padlock tab 44, to secure the lock device 10 over the trailer coupler 20 and thereby restrict access to the coupler socket 24 and handwheel 26 and prevent removal of the housing 11 from the coupler 20. A user can simply and conveniently, access the coupler socket 24 and handwheel 26 by removing the padlock, moving the closure panel 17 to the open position as shown in FIG. 8, and removing the coupler lock device 10 from the coupler 20.

In addition, the coupler lock device 10 can deter theft of a trailer when it is not coupled to a towing vehicle by preventing unauthorized coupling of the trailer to a towing vehicle. By positioning the housing 11 over the coupler socket 24 and handwheel 26 of the uncoupled trailer and locking the closure panel 17 in the closed position, one can restrict an unauthorized person from accessing the coupler socket 24 and handwheel 26 to couple the trailer to an unauthorized towing vehicle.

Figure 5:
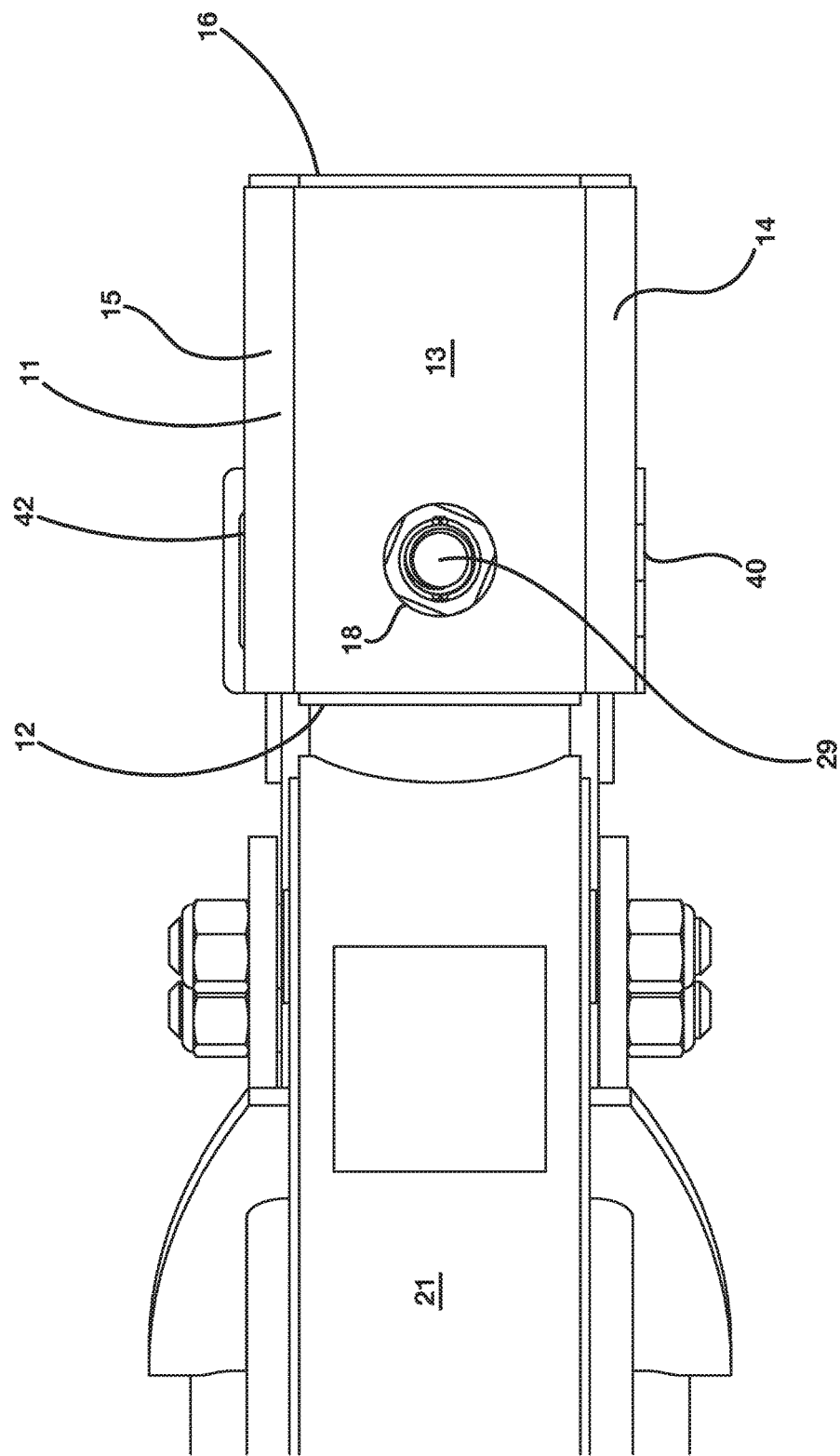
FIG. 5 is a top plan view of the trailer coupler and lock device combination of FIG. 2.

The coupler lock device 10 also can provide visual confirmation to a user that the handwheel 26 is appropriately tightened. As can be seen in FIGS. 2, 5 and 7, the top aperture 18 is sized and positioned in the top panel 13 to allow the handwheel threaded bolt 29 to protrude through the aperture 18 when the coupler lock device 10 is placed over the coupler 20. By selecting appropriate dimensions for the housing 11, when the handwheel 26 is tightened and hitch ball 22 is properly secured within the coupler socket 24 in the proper retention position (as shown in FIG. 1A), the threaded bolt 29 will protrude through the top aperture 18 by a predefined minimum distance to confirm to a user that the handwheel is appropriately tightened. On the other hand, if the handwheel 26 is not properly tightened or the hitch ball 22 is not secured within the coupler socket 24 in the proper retention position (for example, as shown in FIG. 1B), the threaded bolt 29 will not protrude through the top aperture by the predefined minimum distance, thereby alerting the user that the handwheel is not properly secured. For example, in some embodiments, the coupler lock device 10 is dimensioned so that when the handwheel 26 is fully tightened and the hitch ball 22 is secured within the coupler socket 24, the threaded bolt 29 protrudes through the top aperture 18 by a distance in the range of about 8-12 millimeters.

From the foregoing, it can be seen that the apparatus of the present invention possesses numerous advantages. It provides a lock device that can be used with couplers that have a handwheel for securing the hitch ball within the coupler socket. The lock device is of relatively simple construction and is cost-effective to manufacture and maintain, and yet it still can effectively prevent theft of trailers. In addition, the lock device can provide a visual confirmation to a user that the hitch ball is properly secured within the coupler socket.

Upon reading this disclosure, additional advantages and modifications will readily occur to those skilled in the art. Therefore, the invention in its broader aspects is not limited to the specific details, representative devices, and illustrative examples shown and described. Accordingly, departures may be made from such details without departing from the spirit or scope of the general inventive concept.

What is claimed is:

1. A coupler lock device for use with a trailer coupler having a handwheel rotatably mounted to a threaded member of the trailer coupler and configured to secure a hitch ball within a coupler socket of the trailer coupler in a retention position, wherein the coupler lock device comprises:
   a housing configured to cover the handwheel of the trailer coupler, wherein the housing comprises:
      an opening configured to allow the housing to be positioned over the handwheel; and
   a closure member movable between:
      an open position wherein the housing can be positioned over and removed from the coupler socket; and
      a closed position wherein, when the housing is positioned over the handwheel, the closure member restricts removal of the housing from the handwheel;
   wherein the housing defines an aperture configured so that when the housing is positioned over the handwheel and the hitch ball is secured in the retention position within the coupler socket, the handwheel threaded member protrudes through the aperture.

2. The coupler lock device of claim 1 wherein, when the housing is positioned over the handwheel and the hitch ball is secured within the coupler socket in the retention position, the handwheel threaded member protrudes through the aperture by a predefined minimum distance.

3. The coupler lock device of claim 1 wherein the closure member comprises a panel hingedly coupled to the housing.

4. The coupler lock device of claim 1 wherein the housing includes a closure tab and the closure member includes a slot configured to receive the closure tab when the closure member is in the closed position.

5. The coupler lock device of claim 4 wherein the closure tab includes a hole configured to receive a padlock shackle.

6. The coupler lock device of claim 1 wherein the housing is configured to cover the handwheel and the coupler socket.

7. The coupler lock device of claim 6 wherein when the housing is positioned over the coupler socket and handwheel and the handwheel is tightened to secure a ball hitch within the coupler socket, the threaded member protrudes through the top aperture by a predefined minimum distance.

8. The coupler lock device of claim 6 wherein the closure panel comprises a bottom panel hingedly coupled to the housing.

9. The coupler lock device of claim 6 wherein the housing includes a closure tab and the bottom panel includes a slot configured to receive the closure tab when the bottom panel is in the closed position.

10. The coupler lock device of claim 9 wherein the closure tab includes a hole configured for receiving a padlock shackle.

11. A coupler lock device for use with a trailer coupler having a handwheel for securing a hitch ball within a coupler socket, wherein the coupler lock device comprises:
   a housing configured as a cover for a trailer coupler socket and handwheel, wherein the housing comprises a top panel, two opposing side panels, a forward panel and an opening configured to allow the housing to be positioned over the coupler socket and handwheel; and
   a closure panel movable between:
      an open position wherein the housing can be positioned over and removed from the coupler socket and handwheel; and
      a closed position wherein, when the housing is positioned over the coupler socket and handwheel, the closure panel restricts removal of the housing from the coupler socket and hand wheel;
   wherein the top panel includes an aperture configured so that when the housing is positioned over the coupler socket and handwheel and the handwheel is tightened to secure a ball hitch within the coupler socket, the handwheel threaded member protrudes through the top aperture.

12. A coupler lock device comprising:
a housing having an opening configured to receive a trailer coupler in an enclosed position wherein the housing covers a handwheel that is rotatably mounted to threaded member of the trailer coupler and is configured to secure a hitch ball within a coupler socket in a retention position for towing a trailer;
wherein the housing includes a closure member that can be placed in a locked position to restrict removal of the housing from the trailer coupler when the trailer coupler is disposed in the enclosed position; and
wherein the housing includes an aperture configured so that when the trailer coupler is disposed in the enclosed position, the handwheel threaded member protrudes through the aperture.

13. The coupler lock device of claim 12 wherein housing is configured so that when the trailer coupler is disposed in the enclosed position and the handwheel and the hitch ball is secured within the coupler socket in the retention position, the handwheel threaded member protrudes through the aperture by a predefined minimum distance.

14. The coupler lock device of claim 12 wherein, when the trailer coupler is in the enclosed position, the housing covers the handwheel and the coupler socket.

15. The coupler lock device of claim 12 wherein the closure member comprises a panel hingedly coupled to the housing.

16. The coupler lock device of claim 12 wherein the housing includes a closure tab and the closure member includes a slot configured to receive the closure tab when the closure member is in the locked position.

17. The coupler lock device of claim 16 wherein the closure tab includes a hole configured to receive a padlock shackle.

* * * * *